United States Patent [19]
McRobert

[11] Patent Number: 5,979,362
[45] Date of Patent: Nov. 9, 1999

[54] AQUACULTURE SYSTEM

[76] Inventor: Ian McRobert, 24 Celosia Way, Ferndale, Western Australia, Australia, 6148

[21] Appl. No.: 09/272,030

[22] Filed: Mar. 18, 1999

[51] Int. Cl.[6] .................................................... A01K 63/00
[52] U.S. Cl. ............................................................ 119/227
[58] Field of Search .................................. 119/215, 216, 119/217, 219, 224, 226, 227

[56] References Cited

U.S. PATENT DOCUMENTS

| | | | |
|---|---|---|---|
| 4,140,079 | 2/1979 | Frucktnicht | 119/227 |
| 4,290,437 | 9/1981 | Lin | 119/226 |
| 4,972,801 | 11/1990 | Hunt | 119/227 |
| 5,320,068 | 6/1994 | Redditt | 119/226 |
| 5,540,521 | 7/1996 | Biggs . | |
| 5,593,574 | 1/1997 | Van Toever | 119/227 |
| 5,660,142 | 8/1997 | Van Rijn | 119/227 |
| 5,733,464 | 3/1998 | Bunch | 119/215 |

*Primary Examiner*—Thomas Price
*Attorney, Agent, or Firm*—James Ray & Associates

[57] ABSTRACT

Aquaculture system includes a plurality of tanks each capable of holding a volume of water and one or more marine animals. A separate liner is provided for each tank. Liners are attached along the upper peripheral edges to their respective tanks. Displacement system is used for selectively raising and lowering each liner by pumping air between outside surface of liners and inside surface of the tanks. As air is pumped in the liner it inflates and effectively balloons away from the inside surface of its tank. As this occurs, water within the tank is displaced and flows through a water transport conduit formed with each tank to beneath the liner. Accordingly, the liner is progressively raised from a lining position in which it sits inside its tank, to a lifted position in which it overlies the water with the tank. To return the liner to its lining position, the system is again operated this time to direct air into the conduit. When this occurs, air displaces water within the conduit lifting it onto an inside surface of the liner progressively lowering the liner back to its lining position. Channels provide fluid communication between the tanks. When the liner of one tank is raised, the marine animals held within that tank are effectively forced through one or more channels to another tank. With the liner in its lifted or inverted position, it can be easily cleaned. Filter is coupled to the tanks to allow filtering of the water during the lifting of a liner.

5 Claims, 4 Drawing Sheets

AQUACULTURE SYSTEM

FIELD OF INVENTION

The present invention is for a land based aquaculture system.

BACKGROUND OF THE INVENTION

It is known to grow and farm marine animals on land in aquaculture tanks. A typical aquaculture system may include a plurality of stand-alone tanks which may be coupled to a water filtration system. Generally, marine animals of different size are held in different tanks and as the animals grow they are moved from tank to tank until they reach a size where they are ready for the market. The limit on the number of marine animals that can be held in any particular tank is largely dependent on the ability to maintain the water quality by removal of debris (such as feces and uneaten food) from the tank as well as the removal of algae or other growths from the wall of the tank. Currently the only effective method to fully and properly clean the tank is to completely drain it of water and get inside the tank to scrub down its walls and clear away any debris. While the tanks are sometimes connected with water filtration systems, these systems are generally unable to prevent the build up of foreign matter on the bottom of the tank.

When a tank is being cleaned, the marine animals previously held that tank need to be transfered to a holding tank. The current method of doing this is to simply use nets or scoops to catch the fish and physically transfer them to a holding tank.

SUMMARY OF THE INVENTION

It is an object of the present invention to provide a land bused aquaculture system which facilitates an alternate method for cleaning the tanks and also provides an alternate method for transferring marine animals from one tank to another.

According to the present invention there is provided a land based aquaculture system including:

a plurality of aquaculture tanks each capable of holding a volume of water and one or more marine animals;

a separate liner for each tank, the liners attached along their upper peripheral edge to their respective tanks;

a displacement system for raising and lowering each liner, by which any liner can be progressively raised from a lining position in which the liner sits inside said tank and bears the water to a lifted position in which the liner is lifted to overlie the water in the tank so that an inside surface of the liner is exposed, and subsequently progressively lowered the lining position, the displacement system having a screened water transfer conduit through which water, to the exclusion of marine animals, is transferred from above to below the liner as the liner is progressively raised from the lining position to the lifted position; and, one or more channels for providing fluid communication between separate tanks, the channels provided with one or more gates to control the passage of marine animals therealong;

whereby, in use, marine animals in a first tank can be transferred to a second tank by operating the displacement system to raise the liner of the first tank to the lifted position and opening selected gates of the channels to provide a path for the marine animals to travel from the first tank to the second tank so that as the liner of the first tank is raised and the water of that tank is transferred to below the liner via the water transfer conduit the marine animals are effectively directed to swim through the one or more channels to the second tank thereby effecting a transfer of marine animals from the first tank to the second tank and exposing the water bearing surface of the liner of the first tank for cleaning.

Preferably the Aquaculture system is provided with water filtration means for filtering the water in the aquaculture tanks, the filtration means coupled with said tanks so that respective water return lines from the filter to said tanks are positioned to induce a circular flow of water within the tanks and respective water suction lines are positioned to draw water from the tanks from a point adjacent the centre of a bottom wall of each tank whereby, in use, the circular flow of water within the tanks acts to direct debris on the bottom wall of the tanks to the point so that the debris can be carried with water through the suction lines to the filter; the suction lines being movably supported so that they can be withdrawn from the tanks when the displacement system is operated to raise or lower the liners of the tanks.

BRIEF DESCRIPTION OF THE DRAWINGS

An embodiment of the present invention will now be described by way of example only with reference to the accompanying drawings in which.

DETAILED DESCRIPTION OF THE PREFERRED EMBODIMENT

Figure 1:
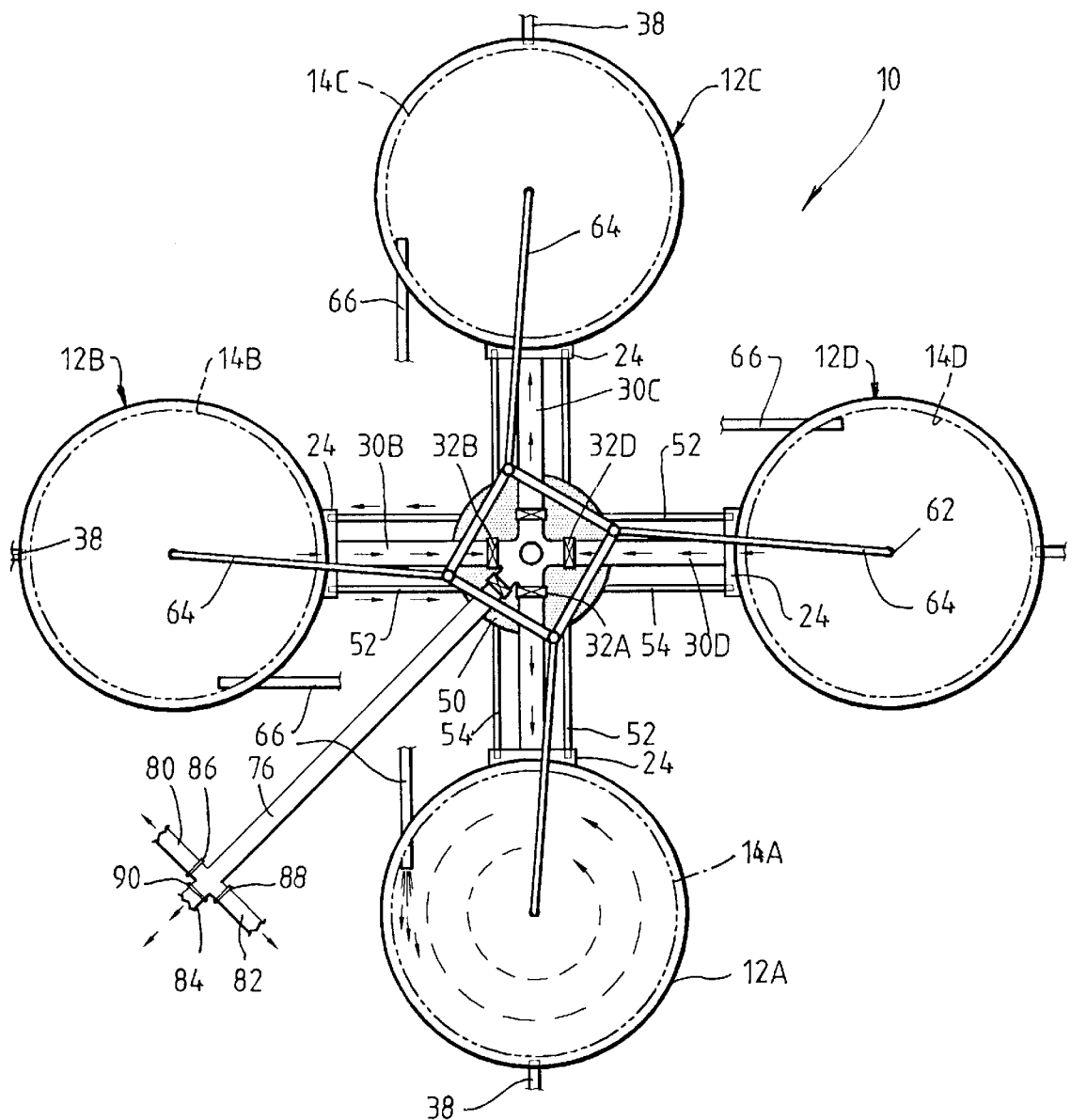
FIG. 1 is a plan view of an embodiment of the aquaculture system.

The aquaculture system 10 includes a plurality (in this instance four) of aquaculture tanks 12A–12D (referred to in general as "tanks 12") each being capable of holding a volume water and one or more marine animals (not shown). A separate liner 14A–14D (referred to in general as "liners 14") is provided for each of the tanks 12A–12D respectively. The liners 14 are attached along their upper peripheral edges to their respective tanks 12. This can be achieve in any conventional manner such as by the use of rib locking strips 16 as typically used for attaching liners to the shell of a swimming pool. A displacement system 18 is used for selectively raising and lowering each liner 14. Details of a suitable displacement system 18 are described in the present applicants International Application Number PCT/AU97/00891 the contents of which is incorporated herein by way of reference.

The displacement system 18 is an air driven system which pumps air between an outside surface 20 of a liner 14 and the inside surface 22 of a tank 12. This causes the liner 14 to inflate and effectively balloon away from the inside surface 22 of its tank 12. As this occurs, water within the tank 12 is displaced and is caused to flow through a water transfer conduit 24 formed in or associated with each tank 12, to beneath the liner 14. Accordingly, the liner 14 is progressively raised from a lining position in which it sits inside tank 12, (and more particularly in this embodiment where the liner's outside surface 20 contacts inside surface 22 of its corresponding tank 12) to a lifted position (shown by liner 14C in FIG. 2) in which the liner overlies the water within the tank so that it inside (fluid bearing) surface 20 is exposed. In order to return the liner 14 to its lining position, the system 18 is again operated this time to direct air into the water transfer conduit 24. When this occurs, the air displaces the water within the conduit 24 lifting it onto an inside surface 26 of the liner 14. As a result the liner 14 is progressively lowered or sunk back to its lining position where the liner sits inside tank 12 with its outside surface 20 contacting the inside surface 22 of its tank 12.

In order to prevent marine animals held within the tank from flowing through the conduit 24 during the initial raising of the liner 14, a mesh screen 29 is placed over the top of the conduit 24 with the mesh size being smaller than the size of the marine animals held within the tank 12.

One or more channels 30A–30D (referred to in general as "channels 30") are coupled to the tanks 12 to provide selective fluid communication between the tanks 12. The channels are provided with one or more gates 32A–32D (referred to in general as "gates 32") to control the passage of marine animals along the channels 30.

Figure 2:
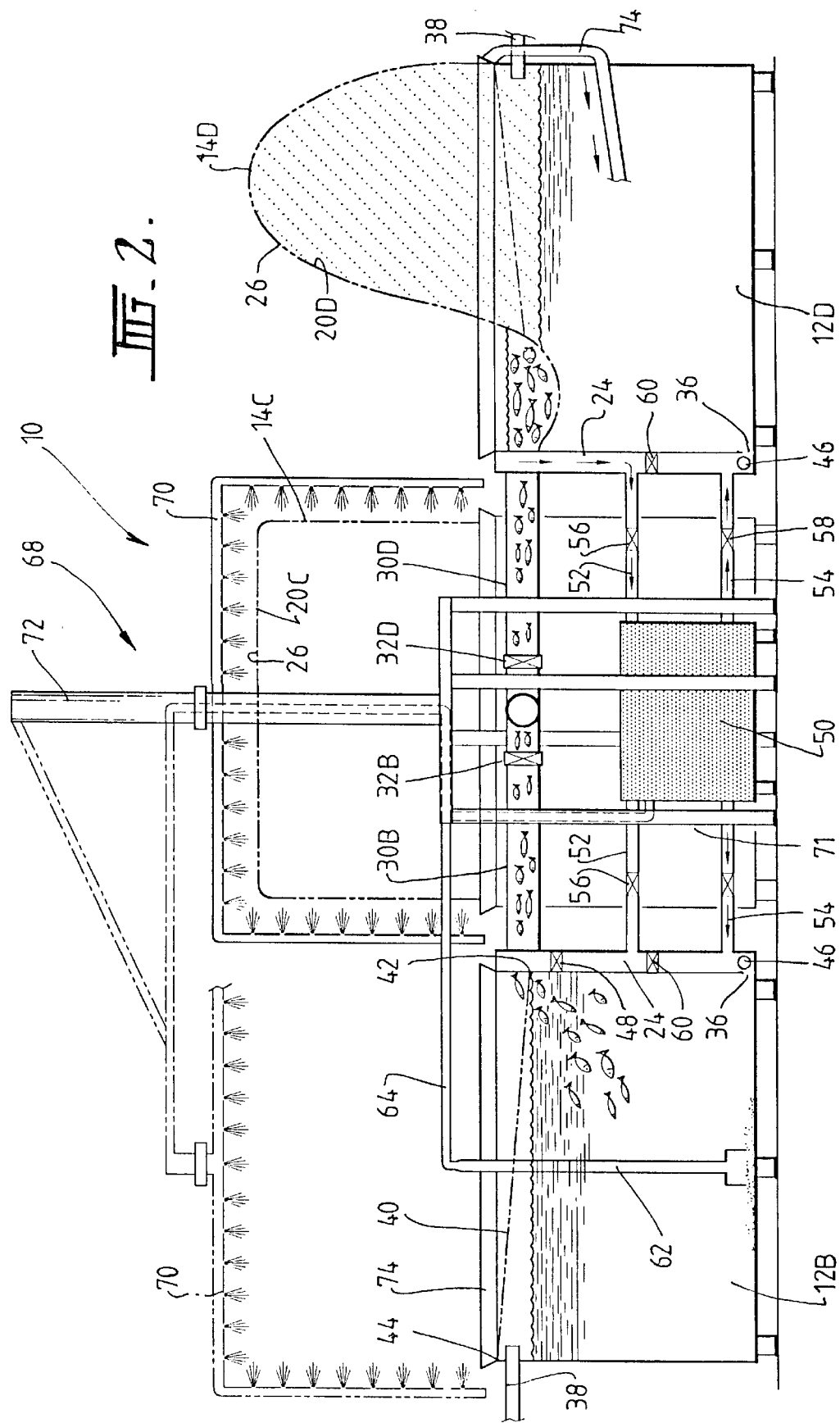
FIG. 2 is a side view of the aquaculture system.

In the present embodiment, each of tanks 12A, 12B and 12C may be used for the farming and growing of marine animals, and tank 12D may be a spare clean holding tank. If for example it is desired to clean tank 12B, the displacement system 18 is operated to raise the liner 14B to its lifted position and gates 32B and 32D are opened. As the liner 14B is progressively raised the water volume holding the marine animals in tank 12B is reduced and the marine animals are effectively directed to swim through channels 30A and 30D into tank 12D. This progressive pushing or directing of fish is depicted in FIG. 2 which shows the liner 14B in an intermediate position between its lining position and its covering position. It can be clearly seen that the marine animals within the tank 12B have no choice but to swim along channels 30B and 30D into tank 12D.

This effectively transfers the marine animals from tank 12B to tank 12D. Simultaneously, the inside (ie fluid bearing) surface 26 of the liner 14B is exposed and can be cleaned.

Figure 3:
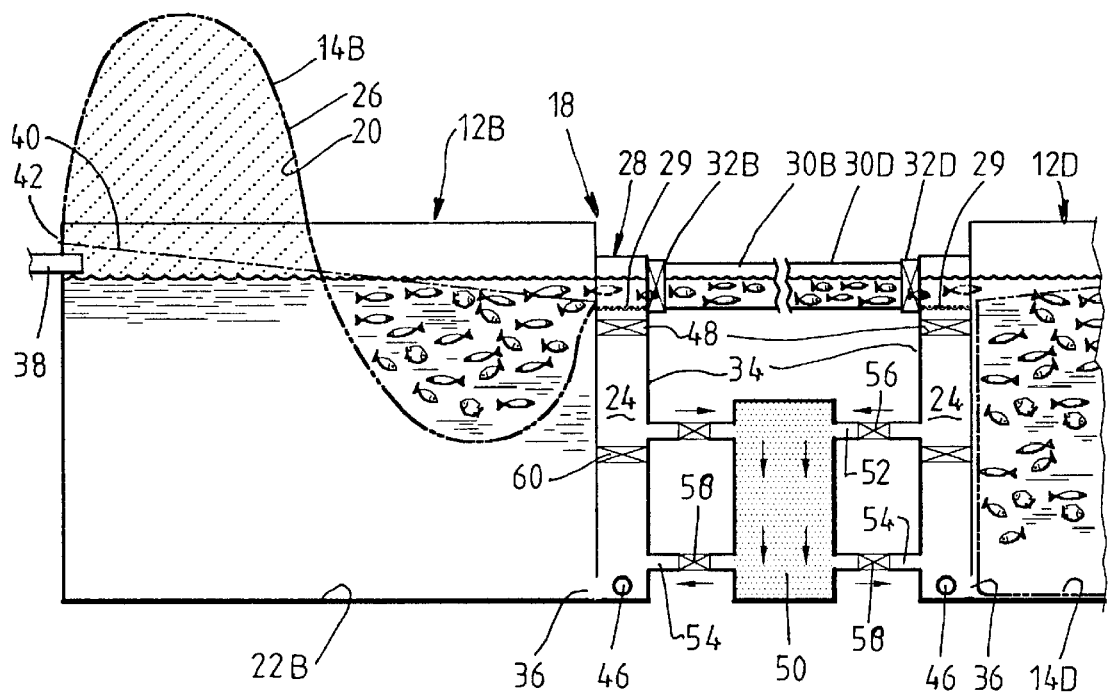
FIG. 3 is an enlarged section view of part of the aquaculture system.
Figure 4:
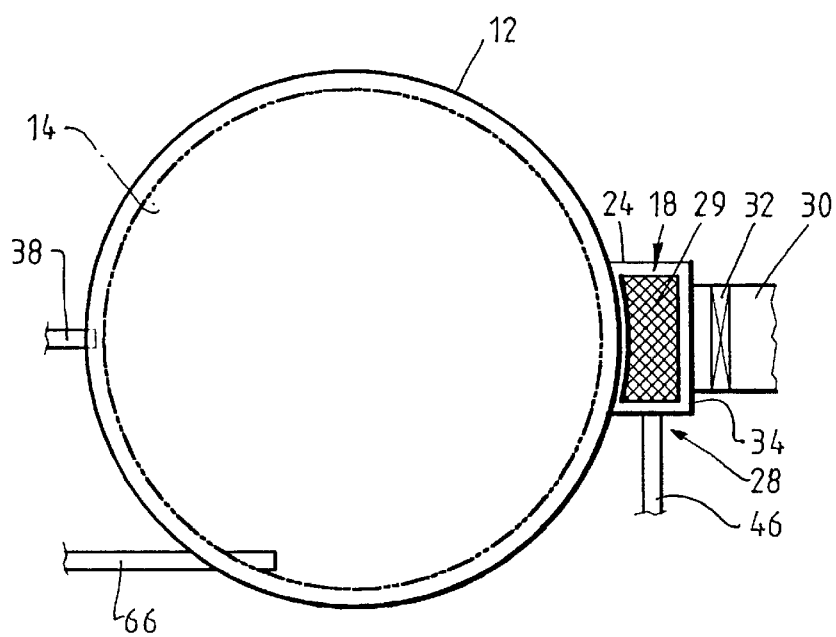
FIG. 4 is a plan view of one tank of the aquaculture system.

The displacement system 18 will now be described in greater detail with reference to FIGS. 3 and 4. Each conduit 24 is essentially a U shaped channel 34 which is attached to an outside surface of a corresponding tank 12. The conduit 24 is in fact defined between the channel 34 and the outside surface of a corresponding tank 12. The bottom of the channel 34 is scaled with the bottom of the tank 12. The mesh screen 29 extends across the top of the channel 34 and conduit 24. More particularly, the screen 29 is disposed in a bottom wall of the channels 30 interconnecting adjacent tanks 12. A lower part of the side wall of the tank 12 in front of the channel 34 is provided with a slot or aperture 36 to allow fluid communication between the conduit 24 and the region between the inside surface 22 of the tank and the outside surface 20 of the liner 14.

A first air inlet pipe 38 is plumped into a side wall of each tank 12 opposite the channel 30 to allow air to be pumped between the inside surface 22 of the tank and the outside surface 20 of the liner 14. The pipe 38 is ideally located at a position above the normal water line in the tank 12 but below the upper peripheral edge 40 of the liner 14. In this regard, it is advantageous for the upper peripheral edge 40 of each liner 14 to be inclined from a highest point 42 which is diametrically opposite the channel 30 to a lowest point 44 which is level with the screen 29 of water transfer conduit 28. A second air inlet pipe 46 is disposed and arranged to direct air into the conduit 24 between a channel 34 and the side wall of the each tank 12.

Immediately below the screen 29 in the conduit 24 is a valve 48 for selectively opening and closing each conduit 24. Filter 50 is provided for optionally filtering the water within the tanks 12 when the liner 14 is inverted. The filter 50 is connected with the conduit 24 via first and second diversion pipes 52 and 54 respectively. Valves 56 and 58 are placed within the pipes 52 and 54 respectively. A further valve 60 is placed in the conduit 24 between the pipes 52 and 54. The filter 50 is common to all of the tanks 12.

In order to transfer fish from tank 12B to tank 12D (refer FIG. 3) liner 14 is raised from its lining position to its lifted position, by pumping air through the first air inlet pipe 38 between the liner 14B and the inside surface of the tank 12B.

Simultaneously, valves 48 and 60 are opened and valves 56 and 58 may be shut. As the air is pumped through inlet 38, it inflates the liner 14B thereby displacing water from the tank 12B to flow through the screen 29, conduit 24 and slot 36 into the tank 12B but beneath the liner 14. For at least an initial period of time while this is happening, the gate 32B is shut. Progressively, the volume of water retained on the inside fluid bearing surface of the liner 14B reduced until only a small volume of the water is left as is shown in FIG. 3. At this point in time, the gates 32B and gate 32D are open. As the liner 14B continues to rise the marine animals held on the inside fluid bearing surface of the liner 14B are then effectively forced to swim through channels 30B and 30D to tank 12D. Depending on relative water levels within the channels 30 and the tanks 12B and 12D while the transfer is occurring valve 48 could be optionally shut. Finally, when the liner 14 is fully inflated, no water remains on the inside surface of liner 14. Rather, all of the water (except for perhaps a small volume which may have been transferred to tank 12D) now lies within the tank 12B below the liner 14B.

In the above description of the raising of liner 14B, the valves 48 and 60 are open and valves 56 and 58 shut. However, if one wanted to filter the water tank 12B during the inversion process, valve 60 could have been closed and valves 56 and 58 open in which case, water flowing through the conduit 24 would be diverted through first diversion pipe 52 through the filter 50 and then out from second diversion pipe 58 back into the conduit 24 and then via slot 36 into the tank 12B.

In order to return the liner 14B from the lifted position to the lining position (after cleaning of the liner 14B) the valves 56 and 58 are closed and valves 48 and 60 open. Air is then passed through the pipe 46 so as to bubble up through the conduit 24. As the air bubbles up through the conduit 24 it displaces the water in the conduit 24 causing it to flow back onto the inside surface of the liner 14B. This then progressively sinks the liner 14B back to the lining position. To return the marine animals which have been transferred from tank 12B to tank 12D the liner 14D in tank 12D is now inverted or moved from the lining position to the lifted position in a similar manner as described before in relation to liner 14B. By appropriate opening of gates 32B and 32D the marine animals are in effect forced to swim from tank 12D through the channels 30D and 30B back to tank 12B. To assist in directing the last of the marine animals which may still be residing in the channel 30 into tank 12B, a slideable grate or paddle (not shown) can be placed behind the last of the marine animals adjacent tank 12B and then slowly slid along channels 30D and 30B towards tank 12B to force the last remaining marine animals into the tank 12B. Gate 32B can then be shut to prevent the marine animals from swimming out of tank 12B along channel 30.

The filter 50 can also be operated in a mode to provide a continuous filtering of the water within the tanks 12 while their liners 14 are in the lining position. In this mode a moveable suction pipe 62 which is supported by a corresponding boom 64 is centrally located within each tank 12 and positioned so as to draw off water from a point adjacent the centre of a bottom wall of the tanks 12. In addition, a water return pipe 66 is positioned to return filtered water to the tank 12 in a manner so as to induce a circular flow of water within the tank. The return pipe 66 would typically be located above the peripheral edge 40 of the liner 14 so as to not interfere with the raising and lowering of the liner 14. The circular flow of water within a tank 12 acts to force any debris within the tank toward the centre of the bottom wall of the tank. Accordingly, the suction pipe 62 can suck up the debris thereby further assisting maintaining water purity and cleanliness. When it is desired to operate the displacement system 18 the suction pipe 62 is simply swivelled or otherwise swung or moved out of its tank 12.

To further assist in the cleaning of the liners 14 when in the raised position a revolving water jet cleaning system 68 can be incorporated into the system 10. The system 68 (refer FIG. 2) includes a manifold 70 bent or otherwise formed in the shape of an inverted U and of a size so that it can be placed over a liner 14 when in the covering position. The manifold 70 has a plurality of holes which are positioned to direct a spray of cleaning fluid onto the inside surface 26 of a liner 14. In order to effectively clean the whole of the outside surface 26, the manifold 70 is supported on a swivel boom 72 so that it can be rotated through at least 180° although preferably it is supported so as to be freely fully rotatable. Further the manifold 70 is supported so that it can be positioned over any one of the liners 14.

The water provided for the manifold 70 can be supplied by a central water supply 71. Alternately, a separate source of cleaning fluid can be provided. Optionally, a gutter 74 may be provided about the exterior periphery of each tank 12 adjacent its upper edge for collecting the water or fluid used for cleaning the liners 14. If the cleaning water is originally provided by the water supply 71, each gutter 74 may be further formed to redirect the water back to the filter 50 for return to the water supply 71.

However, if the cleaning fluid is supplied from outside (and possibly contains chemicals which may adversely effect the health of the marine animals) the gutter system 74 may be directed to a waste water tank (not shown) or simply a drain.

If it is desired to transfer the marine animals from any tank 12 to say a moveable bin or a bucket (as typically would be used to take marine animals to a market) a further channel 76 (refer FIG. 1) can be coupled to the channels 30 via a corresponding gate 78. The channel 76 can be provided with a plurality of branches 80, 82 and 84 and corresponding gates 86, 88 and 90. If say one wishes to transfer marine animals from tank 12B to a transportable tank (not shown) the displacement system can be operated to lift the liner 14B and gates 32B, 78 and 90 opened so that the marine animals within tank 12B are effectively directed to swim through channels 30B, 76 and branch 84 to the transportable tank.

Figure 5:
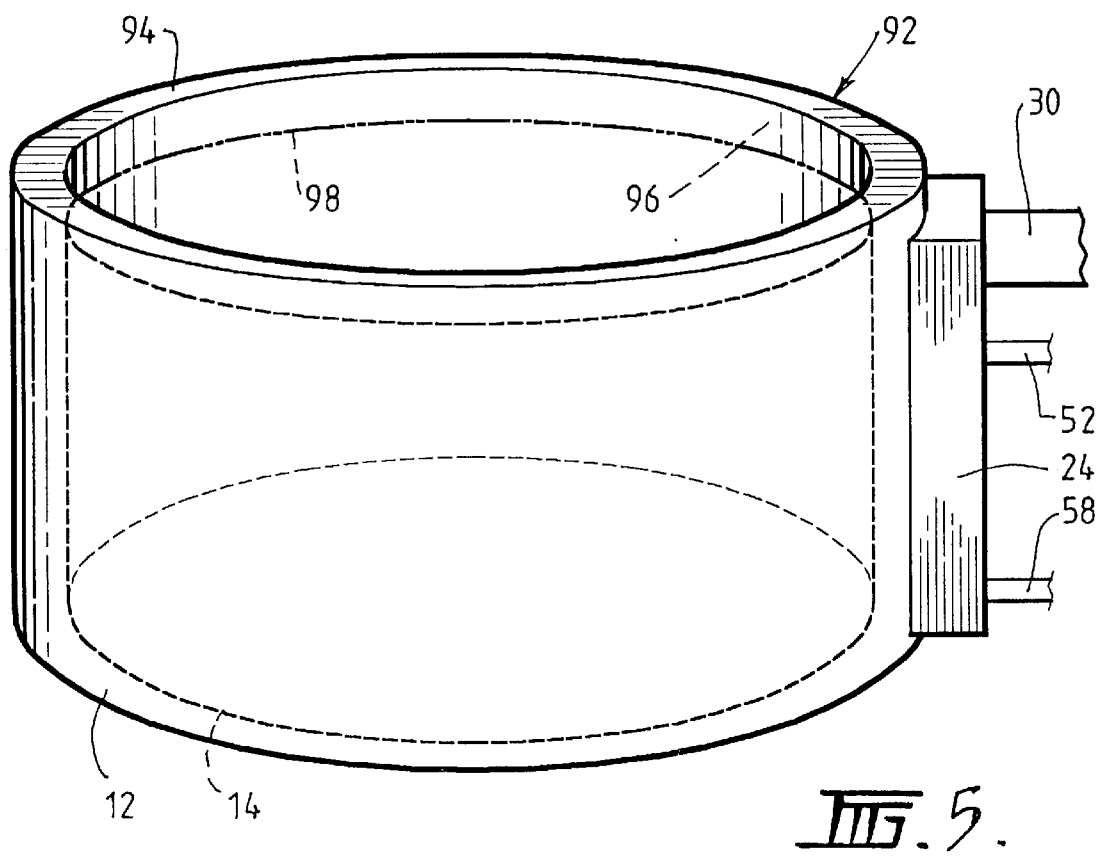
FIG. 5 is a schematic prospective view of a modified tank for use in the aquaculture system: and, FIG. 6 is a partial section view of the tank shown in FIG. 5.
Figure 6:
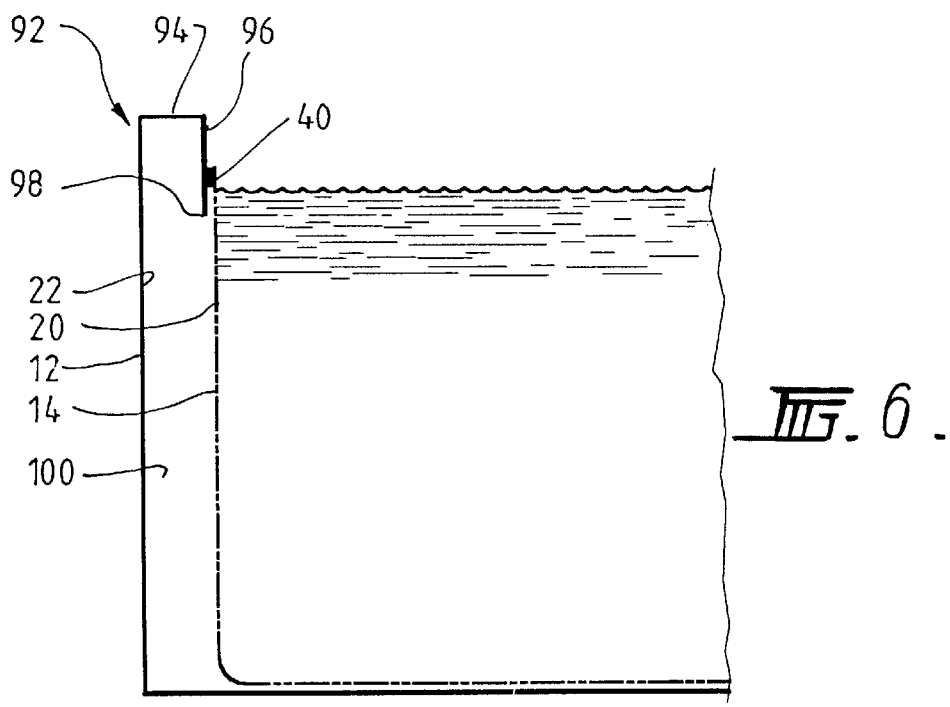

In a further variation shown in FIGS. 5 and 6, a spacer 92 may be provided about the inside upper peripheral edge of each tank 12. The spacer 92 has a right angle section as shown most clearly in FIG. 6 having an annular upper surface 94 and a horizontally depending surface 96. The lowest edge 98 of the surface 96 is ideally disposed below the normal water line. Upper peripheral edge 40 of the liner 14 is attached to the surface 96 above the edge 98. The spacer 92 creates a space or void 100 between inside surface 22 of each tank 12 and outside surface 20 of the liner 14. In this embodiment, the liner 14 is formed as a self supporting liner so as to be substantially undeflected in shape when filled with water. The space 100 can act as a temperature control space by: forming the space 100 as a vacuum thereby providing thermal insulation between the water in the liner tank and the side of the tank 12; or, by pumping air of predetermined temperature through the space 100 to effect heat transfer to or from the water held by the liner 14. Also, when the liner 14 is inverted the water that would normally be transferred to below the liner and therefore held within the tank 12 itself can periodically be drained and sent to a holding tank and warm air and/or oxygen pumped to the tank 12 to assist in drying of the surface 22 of the tank and killing of bacteria that may otherwise grow in any water that may otherwise be trapped between the liner 14 and tank 12 when the liner 14 is in direct contact with the surface 22 of the tank 12 (ie when the spacer 92 is not present). By creating the space 100 there is substantially less likelihood of bacterial growth between the liner and tank because no water for supporting bacterial growth can be trapped between the liner and the side walls of the tank.

Now that an embodiment of the present invention has been described in detail it will be apparent to those skilled in the relevant arts that numerous modifications and variations may be made without departing from the basic inventive concepts. For example, the channels 30 and 76 can be made from any material and can be either open (for example in the form of U shaped channels) or fully closed. Additionally, the channels can be made from either transparent material or opaque material. The gates can be in the form of stationary valves having a flap which simply can be raised or lowered to open and shut the channel 30. Also, any number of tanks 12 can be used in the system 10. In order to assist in the cleaning of the liners 14, a bank of ultraviolet lights can also be used, typically held on a moveable boom, for the purposes of killing bacteria which may be harbouring on the liners 14. In addition a brush may be mounted with the manifold 70 to provide a physical scrubbing of the inside surface 26 of a liner 14. In yet a further variation, a separate rotatable brush can also be provided supported in common with the manifold 70 for scrubbing the inside surface 26 of the liners 14. Conveniently, the rotating brush could be driven by the same water or fluid distributed by the manifold 70.

All such variations together with those while would be obvious to a person or ordinary skill in the art, are deemed to be within the scope of the present invention the nature of which is to be determined from the aforegoing description and the appended claims.

I claim:

1. A land based aquaculture system including:

a plurality of aquaculture tanks each capable of holding a volume of water and one or more marine animals;

a separate liner for each tank, said liners attached along their upper peripheral edge to their respective tanks;

a displacement system for raising and lowering each liner, by which any liner can be progressively raised from a lining position in which said liner sits inside said tank and bears water to a lifted position in which said liner is lifted to overlie such water in said tank so that an inside surface of said liner is exposed, and subsequently progressively lowered said lining position, said displacement system having a screened water transfer conduit through which water, to the exclusion of marine animals, is transferred from above to below said liner as said liner is progressively raised from said lining position to said lifted position; and, one or more channels for providing fluid communication between separate tanks, said channels provided with one or more gates to control a passage of marine animals therealong;

whereby, in use, marine animals in a first tank can be transferred to a second tank by operating said displacement system to raise said liner of a first tank to said lifted position and opening selected gates of said channels to provide a path for such marine animals to travel from said first tank to a second tank so that as said liner of said first tank is raised and such water of said first tank is transferred to below said liner via said water transfer conduit such marine animals are effectively directed to swim through said one or more channels to said second tank thereby effecting a transfer of marine animals from said first tank to said second tank and exposing the water bearing surface of the liner of said first tank for cleaning.

2. The aquaculture system according to claim 1 further including water filtration means for filtering the water in the aquaculture tanks, said filtration means coupled with said tanks so that respective water return lines from a filter to said tanks are positioned to induce a circular flow of water within said tanks and respective water suction lines are positioned to draw water from said tanks from a point adjacent the center of a bottom wall of each tank whereby, in use, the circular flow of water within said tanks acts to direct debris on a bottom wall of said tanks to a point so that such debris can be carried with water through suction lines to said filter; said suction lines being movably supported so that they can be withdrawn from said tanks when said displacement system is operated to raise or lower said liners of said tanks.

3. The aquaculture system according to claim 2 further including first and second pipes to provide fluid communication between said filtration means and water transfer conduit and first and second valves for controlling flow of water through said first and second pipes respectively whereby when said first and second valves are open water transferred from above said liner to below said liner is diverted from an upper part of said water transfer conduit into said filtration means through said first pipe and returned through said second pipe back to a lower part of said water transfer conduit.

4. The aquaculture system according to claim 3 further including a third valve located in said water transfer conduit between said first and second pipes, said third valve being controlled to be closed when said first and second valves are open for diverting said water through said filtration means.

5. The aquaculture system according to claim 1 further including spacer means formed about an inside upper peripheral edge of each tank and to which an upper peripheral edge of the liners for each tank is attached, said spacer acting to space an outside surface of side walls of each said liner from an inside surface of its tank to create a space therebetween.

* * * * *